Dec. 11, 1962     F. R. NICHOLSON     3,067,464
ADJUSTMENT MECHANISM
Filed Sept. 20, 1960     2 Sheets-Sheet 1
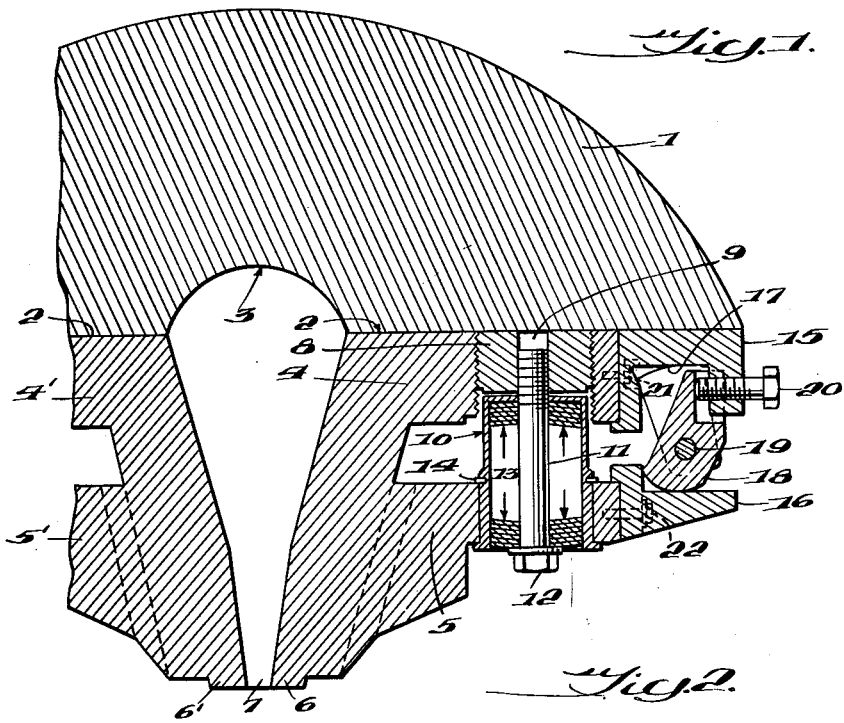
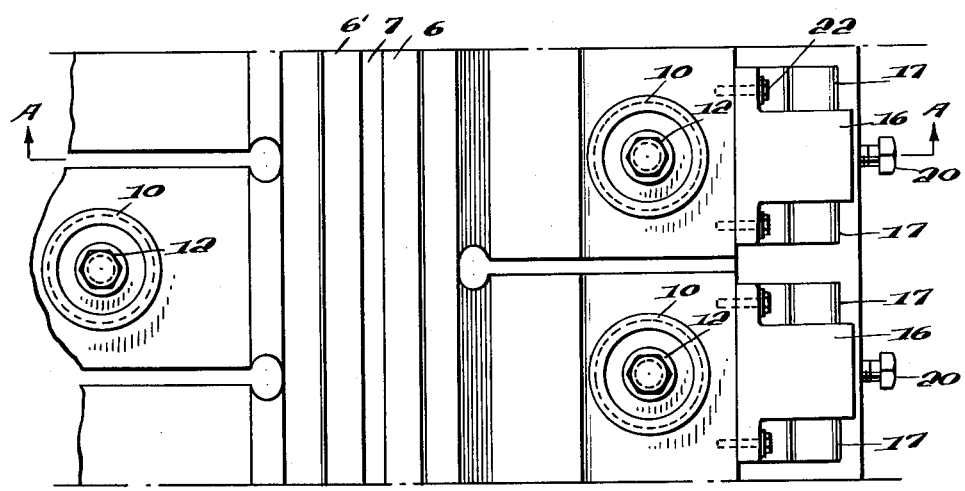
INVENTOR
FRANK RAYMUND NICHOLSON,
BY Francis A. Painter
AGENT Dec. 11, 1962  F. R. NICHOLSON  3,067,464
ADJUSTMENT MECHANISM
Filed Sept. 20, 1960  2 Sheets-Sheet 2
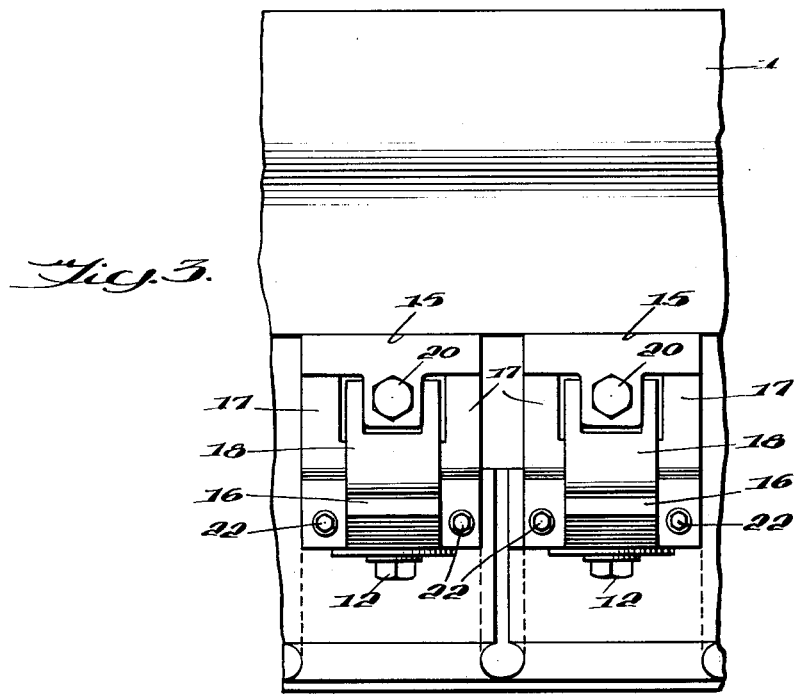
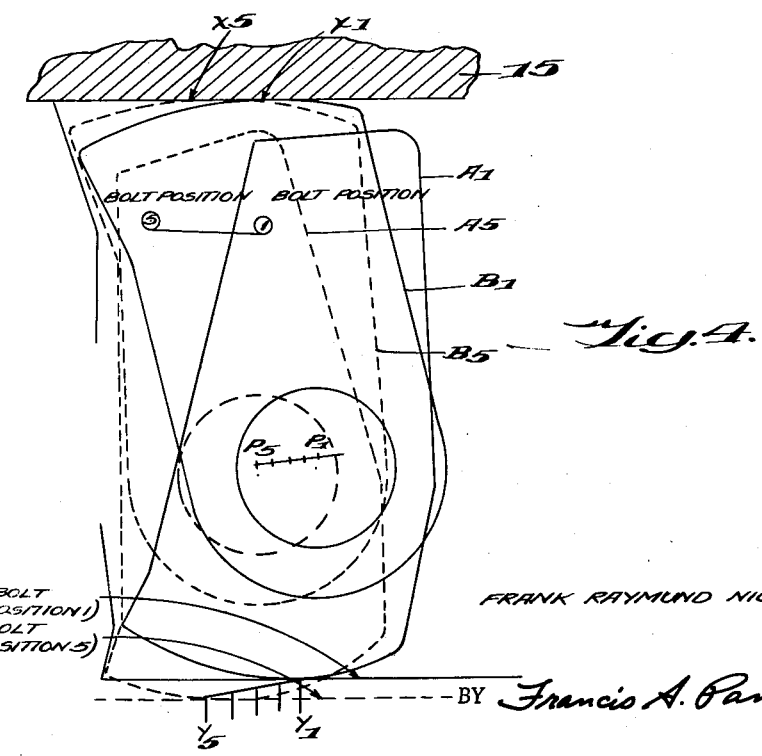
INVENTOR
FRANK RAYMUND NICHOLSON,
BY Francis A. Paintin
AGENT

United States Patent Office 3,067,464
Patented Dec. 11, 1962

3,067,464
ADJUSTMENT MECHANISM
Frank Raymund Nicholson, Circleville, Ohio, assignor to
E. I. du Pont de Nemours and Company, Wilmington,
Del., a corporation of Delaware
Filed Sept. 20, 1960, Ser. No. 57,202
10 Claims. (Cl. 18—12)

This invention relates to an adjustment mechanism. More particularly, this invention relates to a mechanism for precisely adjusting the lips of an extrusion slot orifice in an apparatus for the extrusion of continuous films.

The employment of adjusting mechanisms is indispensable to a great many mechanical processes and apparatus. It is frequently necessary to adjust the position of a mechanical member, upon which reversible resistive forces operate. These forces can be in many forms, such as a frictional resistance or a flexing force. The problem arises to find a mechanism that will always move the mechanical member with instantaneous and precise response without introducing lags or "dead spots" before any movement is felt. This becomes increasingly more difficult when the resistive forces are high and the required accuracy of positioning has to be very precise.

The existing designs of such adjustment mechanisms, however, all suffer from several disadvantages. For example, in the conventional differential-type screws used for adjustment of the slot widths of flat film extrusion dies, the following drawbacks are noted: (1) occurrence of "dead spots" causing a lag in response of thickness adustment to movement of the adjustment bolt, (2) instability of extrusion hopper lip to pressure and temperature changes, (3) because of "dead spots" a specific bolt position does not represent a specific lip position and thus a visual indication of shape of hopper lip is not possible and it is difficult to return the hopper lip to its initial shape, (4) in order to minimize instability due to "dead spots," no separation of the adjusting bolt segments by machine slot is permissible and as a consequenc overstrain results due to the excessively high load required on adjustment bolts; moreover, very high loads are required for any adjustment of the hopper lip, frequently resulting in jammed adjusting bolts, (5) existing designs are not readily adaptable to automatic control (mechanization).

It is an object of this invention, therefore, to provide an improved mechanism which permits the precise, rapid and positive adjustment of the mechanical elements. A further object is to provide an adjustment mechanism particularly for use in flat film extrusion dies, which (1) eliminates "dead spots" by applying a heavy spring loading force on the adjustment linkage, (2) eliminates instability of hopper lips to temperature and pressure changes, (3) permits separation of the adjusting bolt segments by machine slots, which reduces the load put on the adjusting bolt thereby reducing the risk of over-strain, and also permits a reduction of the stiffness of the hopper lip, thereby eliminating jamming of the adjustment bolt, (4) allows for visual indication for shape of the hopper lip, and (5) is readily adaptable to automatic control (mechanization). Other objects will appear hereinafter.

These and other objects are accomplished by the present invention which, briefly stated, comprises an adjustment mechanism comprising in combination a U-shaped member having an upper arm and a lower arm, said lower arm having a projecting surface which requires accurate adjustment, the arms of said U-shaped member inward of their extremities having:

(a) Compressive springing means attached thereto resisting their outward movement,
(b) An upper and a lower cam toggle lever connected together by pivot means, said levers located between the extremities of said arms of said U-shaped member each of said levers having camming surfaces in contact with the interior surfaces of the said arms, and
(c) A threaded adjusting bolt extending inwardly through the extremity of said upper arm threadably engaged therewith and in contact with the upper end of the lower cam toggle lever;

the said levers being held in compression between the arms of said U-shaped member and coacting with said adjusting bolt whereby rotation of said adjusting bolt causes movement of said levers and resulting movement of the said arms.

Because of its commercial importance, particular emphasis in the description and illustrations to follow will be placed on the employment of mechanisms of the present invention in flat film extrusion apparatus. It is to be understood, however, that the application of mechanism of the present invention is not restricted to flat film extrusion dies alone but may be ideally applied to any situation where elimination of backlash (free play) in an adjustment mechanism, particularly in a device for automatic gauge control, is deemed mandatory.

This invention will now be described with reference to the accompanying drawings wherein similar reference numerals refer to similar parts throughout the several views and wherein:

FIG. 1 is a vertical cross-sectional view of the extrusion apparatus taken substantially along line A—A of FIG. 2.

FIG. 2 is a plan view of part of the bottom of the extrusion apparatus.

FIG. 3 is a side elevation of the extrusion apparatus.

FIG. 4 is a schematic sketch of the cam toggle unit illustrating the positions taken up by the toggle levers as the adjusting bolt is progressively screwed in.

Referring now to the drawings, the film apparatus, broadly stated, comprises a main body section 1 having a machined flat bottom 2 to either side of a longitudinal channel 3. Two coacting lip members are mounted on main body 1 at each side of channel 3 extending lengthwise of the main body member. These lip members are U-shaped and comprise upper arms 4 and 4' machined to seat closely on the flat surface 2, lower arms 5 and 5', and dependent straight-edged lips 6 and 6' defining extrusion orifice 7 which, together with channel 3, is sealed by suitable end plates (not shown). The lip members are identical in construction except that they are reversed in position and the position of the adjustment mechanisms along the lips are staggered as shown in FIG. 2. The lip members are constructed of material which permits springing of the lower arm to or away from the upper arm with a comitant movement of the lip edge. Each of the adjustment mechanisms adapted to provide adjustment of the lip members comprises a cylindrical adjustment plug 8 in threaded engagement with the upper arm 4 of the lip member. This plug has a cylindrical threaded opening 9 bored therethrough. Immovably restrained in the lower arm 5 of the lip member is a cylindrical sleeve 10 which is closed at the end nearest the plug 8. The closed end is provided with a centrally bored opening through which axially passes a bolt 11. A clearance of about 1/16 inch is left between sleeve 10 and plug 8 to allow the lip to be moved over its adjustment range. One end of the bolt is threadably engaged with cylindrical opening 9 and the other end terminates in a flanged fitment 12 which enables the bolt to be rotated axially. Confined in sleeve 10 are spring mechanisms 13 adapted to maintain a continuing pressure against the two arms of the lip members. Preferentially, the spring stacking consists of a series of disc type springs, i.e., Belleville washers, assembled in spring sleeve 10. The spring sleeve has a retaining ring 14 to hold its position in the lip member. The bolt 11 passes through the center of the spring and into adjustment plug 8. The spring stack is arranged to force the two sides of the lip member together and the amount of this force is determined by the spring stack arrangement and by the amount of force applied to bolt 11. The purpose of the compression spring mechanism is to keep the two arms of the lip member in a closed position, i.e., the two sides of the lip member are forced towards each other, thus tending always to close "the back of the U." This also serves the purpose of keeping the actual adjustment mechanism, the cam toggle unit and linkages, always under approximately constant tension.

The cam toggle unit illustrated consists of six parts: an upper cantilever arm 15, a lower cantilever arm 16, an upper cam toggle lever 17, a lower cam toggle lever 18, a connecting pin 19 and a threaded adjusting bolt 20. The upper cantilever arm 15 provides a bearing surface contacted by the upper cam toggle lever 17. The lower cantilever arm 16 provides a similar bearing surface contacted by lower cam toggle 18. The important feature of this design is that the cam toggle levers 17 and 18 are always kept in contact with the contilever arms by the applied pressure of the disc springs. There is no sliding between the surfaces. The shape of the cam toggle surface is also of vital importance. This must be designed so that the desired travel of the extrusion lip 6 is obtained in a linear manner. That is, as the threaded adjusting bolt 20 is successively turned by increments of one turn, the separation of the upper and lower cantilever arms must likewise increase uniformly. In this way, uniform gauge response is obtained throughout the length of travel of the bolt. This feature is essential when the device is applied to automatic gauge control. The shape of this cam toggle surface to obtain linearity is determined by graphical construction known to those skilled in the art. Another important feature in that design is the shape of inplaned surface of the upper and lower cantilever arms where the tips of the cam toggle levers come into contact. The shape of the surface is preferably arranged so that the points of the two cam toggle levers move along a straight line.

The function of bolts 21 and 22 is to attach the upper and lower cantilever arms to the lip members, 4 and 5, respectively. Bolt 20 can be attached to a motor which may, in turn, be actuated by an automatic control mechanism. If this control mechanism is sensitive to the gauge of the film being extruded, complete automation may be realized.

As mentioned previously, the function of the spring mechanism is to keep the adjustment mechanism (cam toggle unit) under approximately constant tension, thereby eliminating all free play in all linkages. The arms 4 and 5 of the lip member are at all times forced toward each other (the lip edge 6 will be forced away from the opposing lip edge 6', i.e., tend to move to the open position). As bolt 20 is turned in a clockwise manner, the cam toggle levers 17 and 18 roll over the surfaces of the cantilever arms 15 and 16, creating a force against the arms 4 and 5 in excess of that force exerted by the compressive spring mechanism tending to keep them together, thereby forcing them to open and thus cause the extrusion orifice 7 to be narrowed. In the case of an extrusion apparatus used for the preparation of polyethylene terephthalate, the spring stacking consists of 5 Belleville (disc) springs in parallel, and five of these stacks in series, making 25 springs in all. The spring dimensions employed are 34 mm. outside diameter, 16 mm. inside diameter and 2 mm. thickness. A torque of 25 foot-pounds is applied to bolt 11 through fitment 12. With this arrangement, the load is applied to open the lips 6 and 6' to their full extent at the same time the spring stack is compressed to allow sufficient travel within the spring and to allow the full travel of the lip as the cam is moved. This spring stack will have to be arranged according to the cross-section of the particular lip concerned. In the case of the polyethylene terephthalate extrusion apparatus, the loading is in the order of 4100 pounds of force applied by the spring which allows a lip travel measured at bolt 12 of ± 0.012 inch about the mean position of the lip. For any other lip these figures would have to be modified according to what is required, for example, the required lip travel and the stiffness of the particular lip cross-section.

FIGURE 4 is a schematic sketch of the cam toggle unit illustrating the positions taken up by the cantilevers as the adjusting bolt is progressively screwed in. As the bolt is turned progressively clockwise, the center of the connecting pin travels successively through the point $P_1$ to $P_5$ at the same time the cantilevers rotate from position $A_1$ to $A_5$ and $B_1$ to $B_5$, respectively, by rolling along their contacting surfaces (upper and lower, respectively). The points of contact progressively change from $X_1$ to $X_5$ and $Y_1$ to $Y_5$.

In the case of the polyethylene terephthalate extrusion apparatus, the separation of the lip member surfaces may be moved over a range of ±0.012 inch corresponding to a total horizontal bolt travel of ½ inch and a horizontal travel of the connecting pin of ¼ inch. The number of threads per inch on the bolt has to be properly selected. The threads selected by the polyethylene terephthalate extrusion apparatus is 24 threads per inch. This means that with a bolt travel of ½ inch, 12 turns of the bolt are available. Selection of this thread is, therefore dependent upon the required sensitivity, i.e., the number of turns of the bolt required to correspond to the full amount of the lip travel. This figure can be selected as desired. The sensitivity can also be changed by varying the profile of the cam surfaces on the toggle levers.

The extrusion apparatus such as used in the extrusion of applied film material such as polyethylene terephthalate, polyethylene, etc., migh comprise one or two adjustable lip members having a series of adjustment mechanisms at equally spaced apart locations. In cases such as the extrusion of polyethylene terephthalate where fine adjustments are necessary (microinches), the adjustment mechanism characteristic of the present invention shows a great advantage.

The adjustment mechanism of the present invention overcomes many of the disadvantages which severely limit the use of mechanisms of existing design. This invention eliminates "dead spots" by applying a heavy loading force to keep the linkages of the adjusting mechanism loaded at all times. By eliminating the "dead spots" and hence free play (backlash) in the threads of the adjusting mechanism, immediate positive response is insured. Over-strain on the linkages of the adjusting mechanism is minimized because of the segments between adjacent adjusters. Because free play is eliminated, one position of the adjusting bolt represents one position of the device being adjusted. In the case of the extrusion apparatus shown on FIG. 1, the distance between the head of bolt 20 and the face of the upper cantilever arm 15 gives a positive indication of the shape of the lip member. Alternatively, a revolution counter connected to the adjusting bolt will also indicate the lip position. By returning the adjusting bolt to its initial position the lip member can be returned to its initial position or to any former position by merely resetting the gaps or counters to their initial values. Because the adjusting mechanisms are virtually solid "connections," individual adjusting segments are able to be separated by machine cuts reducing the lip member stiffness and loads on the adjusting bolt, thereby materially eliminating jamming of the adjusting bolts. The differential adjusting mechanism is readily accessible, which is of considerable importance in extrusion apparatus for which the adjustment mechanism of the present invention is ideally suited. It is particularly suited for automatic gauge control which may be accomplished by attaching the adjusting bolt to a motor. The adjustment mechanism of the present invention may be ideally employed, however, in any situation where elimination of backlash (free play) is mandatory in an adjusting mechanism.

What is claimed is:

1. An adjustment mechanism comprising in combination a U-shaped member having an upper arm and a lower arm, said lower arm having a projecting surface which requires accurate adjustment, the arms of said U-shaped member inward of their extremities having:
   (a) compressive springing means attached thereto resisting their outward movement,
   (b) an upper and a lower cam toggle lever connected together by pivot means, said levers located between the extremities of said arms of said U-shaped member each of said levers having camming surfaces in contact with the interior surfaces of the said arms, and
   (c) a threaded adjusting bolt extending inwardly through the extremity of said upper arm threadably engaged therewith and in contact with the upper end of the lower cam toggle lever; the said levers being held in compression between the arms of said U-shaped member and coacting with said adjusting bolt whereby rotation of said adjusting bolt causes movement of said levers and resulting movement of the said arms.

2. Adjustment mechanism according to claim 1 wherein the said compressive springing means (a) attached to the arms of the U-shaped member comprises a bolt threadably engaged with the said upper arm at one end and terminating in a flanged fitment at the other end, a cylindrical sleeve projecting fixedly through the said lower arm and being closed at the end nearest said upper arm, the said bolt passing axially through the said sleeve and spring tensioning means situated within said sleeve being restrained by the said flanged fitment of the bolt at one end and the said closed end of the sleeve at the other end.

3. Adjustment mechanism according to claim 2 wherein the spring tensioning means are disc type springs.

4. Adjustment mechanism according to claim 1 wherein the said camming surfaces of the said levers are arcuate and the said interior surfaces of the said arms are planar.

5. Adjustment mechanism according to claim 1 wherein the said extremities of said arms of said U-shaped member are separate members attached to the said arms.

6. In a flat film extrusion apparatus comprising a body member having a lengthwise channel in its bottom surface, a pair of spaced orifice-defining lip members on each side of said channel attached to its bottom surface and end plates for said body and lip members, the improvement which consists in at least one of said orifice-defining lip members being U-shaped and comprising an upper arm bearing against and attached to the bottom of said body member, a lower arm, and a closed end the outer surface of which constitutes a hopper lip; and a plurality of identical adjusting mechanism spaced along the length of said U-shaped member, each of said mechanism comprising:
   (a) compressive springing means attached to the said arms of the U-shaped member inward of their extremities resisting their outward movement,
   (b) an upper and a lower cam toggle lever connected together by pivot means, said levers being located between the extremities of the arms of said U-shaped member, each of said levers having camming surfaces in contact with the interior surfaces of said arms, and
   (c) a threaded adjusting bolt extending inwardly through the extremity of said upper arm threadably engaged therewith and in contact with the upper end of the lower cam toggle lever; the said levers being held in compression betwen the arms of the U-shaped member and coacting with said adjusting bolt whereby rotation of said adjusting bolt causes movement of said levers and resulting movement of said arms.

7. Apparatus according to claim 6 wherein the said compressive springing means (a) attached to the arms of the U-shaped member comprises a bolt threadably engaged with the said upper arm at one end and terminating in a flanged fitment at the other end, a cylindrical sleeve projecting fixedly through the said lower arm and being closed at the end nearest said upper arm, the said bolt passing axially through the said sleeve and spring tensioning means situated within said sleeve being restrained by the said flanged fitment of the bolt at one end and the said closed end of the sleeve at the other end.

8. Apparatus according to claim 7 wherein the spring tensioning means are disc type springs.

9. Apparatus according to claim 6 wherein the said camming surfaces of the said levers are arcuate and the said interior surfaces of the said arms are planar.

10. Apparatus according to claim 6 wherein the said extremities of said arms of said U-shaped member are separate members attached to the said arms.

References Cited in the file of this patent
UNITED STATES PATENTS
2,765,492    Velvel ................ Oct. 9, 1956